United States Patent

[11] 3,549,866

[72] Inventors John Edwin McWade
Broomall;
Patrick Edward Lannan, Fort Washington, Pa.

[21] Appl. No. 623,057
[22] Filed Mar. 14, 1967
[45] Patented Dec. 22, 1970
[73] Assignee AMP Incorporated
Harrisburg, Pa.

[54] ELECTRO-MECHANICAL MEMORY APPARATUS
5 Claims, 12 Drawing Figs.

[52] U.S. Cl. .......... 235/61.11, 271/40
[51] Int. Cl. .......... G06k 7/04, B65h 1/18
[50] Field of Search .......... 101/93M, 93RC, 94, 95, 92, 287; 235/61.113, 61.112; 271/40, 51

[56] References Cited

UNITED STATES PATENTS

| | | | |
|---|---|---|---|
| 1,516,772 | 11/1924 | La Boiteaux | 235/61.113 |
| 2,049,719 | 8/1936 | Peirce | 235/61.113 |
| 2,238,507 | 4/1941 | Ruttiman | 101/287 |
| 2,528,411 | 10/1950 | Beattie | 235/61.113X |
| 2,973,142 | 2/1961 | Jenner | 235/61.113 |
| 2,983,445 | 5/1961 | Johnson et al. | 235/61.113 |
| 3,201,570 | 8/1965 | Perez et al. | 235/61.113 |
| 3,386,654 | 5/1968 | Wallace | 235/61.1 |

*Primary Examiner*—Daryl W. Cook
*Assistant Examiner*—Robert M. Kilgore
*Attorneys*—Curtis, Morris and Safford, Marshall M. Holcombe, William Hintze, William J. Keating, John R. Hopkins, Adrian J. La Rue, Jay L. Seitchik and Frederick W. Raring

ABSTRACT: An electromechanical memory apparatus is disclosed which utilizes punched cards for data storage. The apparatus includes a card storage bin and a feed mechanism to drive and position cards one at a time into a read position to be read by a static card reader capable of reading simultaneously all data positions on a given card with a read output being provided as long as is desired. An eject mechanism is provided to eject cards, after reading, into a storage bin which positions the cards for reuse.

ELECTRO-MECHANICAL MEMORY APPARATUS

BACKGROUND OF THE INVENTION

The use of punched cards to store data is well-known and a wide variety of devices are available for collating and reading such cards. Most of these devices are relatively large and complex and are, therefore, not practical for use in applications wherein a small capacity memory is required. The only available alternative to large, high cost and high speed card handling apparatus is what is termed a "static" card reader which is manually operated to read one card at a time, but which includes no means for automatically feeding, positioning, reading and ejecting cards. For small size memory applications the other practical alternatives are punched and magnetic tape devices, which have a very limited parallel bit output capability.

SUMMARY OF THE INVENTION

The present invention relates to a small sized memory apparatus capable of semiautomatically or automatically providing a parallel and static output of a relatively large number of data bits stored in punched cards. it is an object of the invention to provide a compact and inexpensive data storage apparatus utilizing punched cards as the storage medium. It is a further object to provide an apparatus for automatically feeding punched cards one at a time into a reading position, reading the data contained on such cards to provide a static output, and then on command from a single signal, ejecting such card into a card storage bin, stacked for immediate reuse. It is still a further object of the invention to provide an inexpensive and reliable card handling mechanism capable of picking one card at a time and transporting such card into a read position with minimum card damage and maximum accuracy of card alignment for reading purposes. It is another object of the invention to provide an automatic card reader having a control cycle which is simple and reliable in that few command signals are required and overall control can be effected responsive to card movement and position.

The invention apparatus achieves the foregoing objectives through the combination of a standard static card reader and a card stacking, picking and transport mechanism capable of picking cards one at a time from the bottom of a stack of cards and positioning such cards within the reader, the card position effecting operation of the reader to read the card and provide a continuous output of the data therein. The card feeder mechanism is arranged relative to the card reader mechanism to eliminate the need for an exact control over the card drive to thereby reduce the complexity of the apparatus and improve the reliability thereof in the face of expected wear during use. The eject mechanism is arranged to be driven by the feed mechanism to eliminate the need for separate eject drive and control components.

DESCRIPTION OF THE PREFERRED EMBODIMENT

Figure 1:
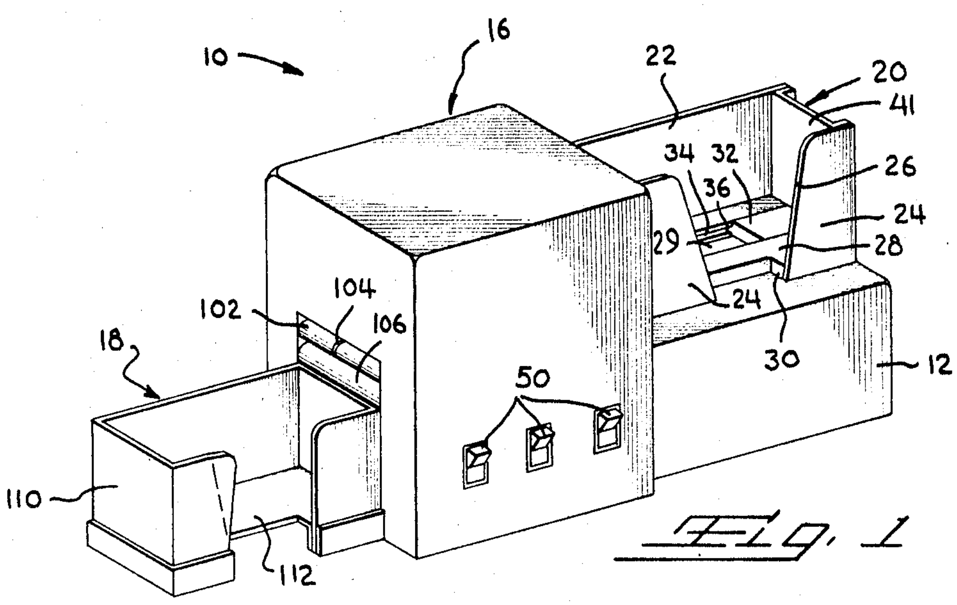
FIG. 1 is a perspective of the apparatus of the invention.

Referring now to FIG. 1, the invention apparatus shown as 10 includes a sheet metal housing 12 defining on the right a punched card data storage bin 20, a card reader 16 in the center and to the left a card storage bin 18 positioned to receive cards ejected from the reader 16. The bin 20 is of a configuration to receive a stack of punched data cards shown generally as C in FIG. 7. It is contemplated that an invention apparatus may be utilized with any of a variety of different types of punched data cards by an appropriate dimensioning of the elements and components therein. The particular embodiment herein disclosed is for a 264 bit card having bit locations in a 12 row by 22 column arrangement. A card of this size is capable of storing a considerable amount of information which can be simultaneously output or scanned row by row or column by column by means external to the apparatus 10. In an actual embodiment of the apparatus 10, the bin 20 was made to store a stack of approximately 400 such cards. The bin 18 would, of course, have this same stack capability.

On the front of the reader unit are three manual pushbuttons 50 labeled POWER, FEED and EJECT. These three pushbuttons are each connected to a microswitch operable to cause the apparatus to sequentially pick cards from the bottom of the stack in bin 20, read the picked card and eject such card into the bin 18. While not shown, it is contemplated that a standard counter may be employed to count the cards passed through 16 and provide an index if the card in a reading position relative to its position in a stack.

The use of a counter would be desirable in applications wherein any one of the cards in the stack might be used without regard to position in the stack.

Figure 2:
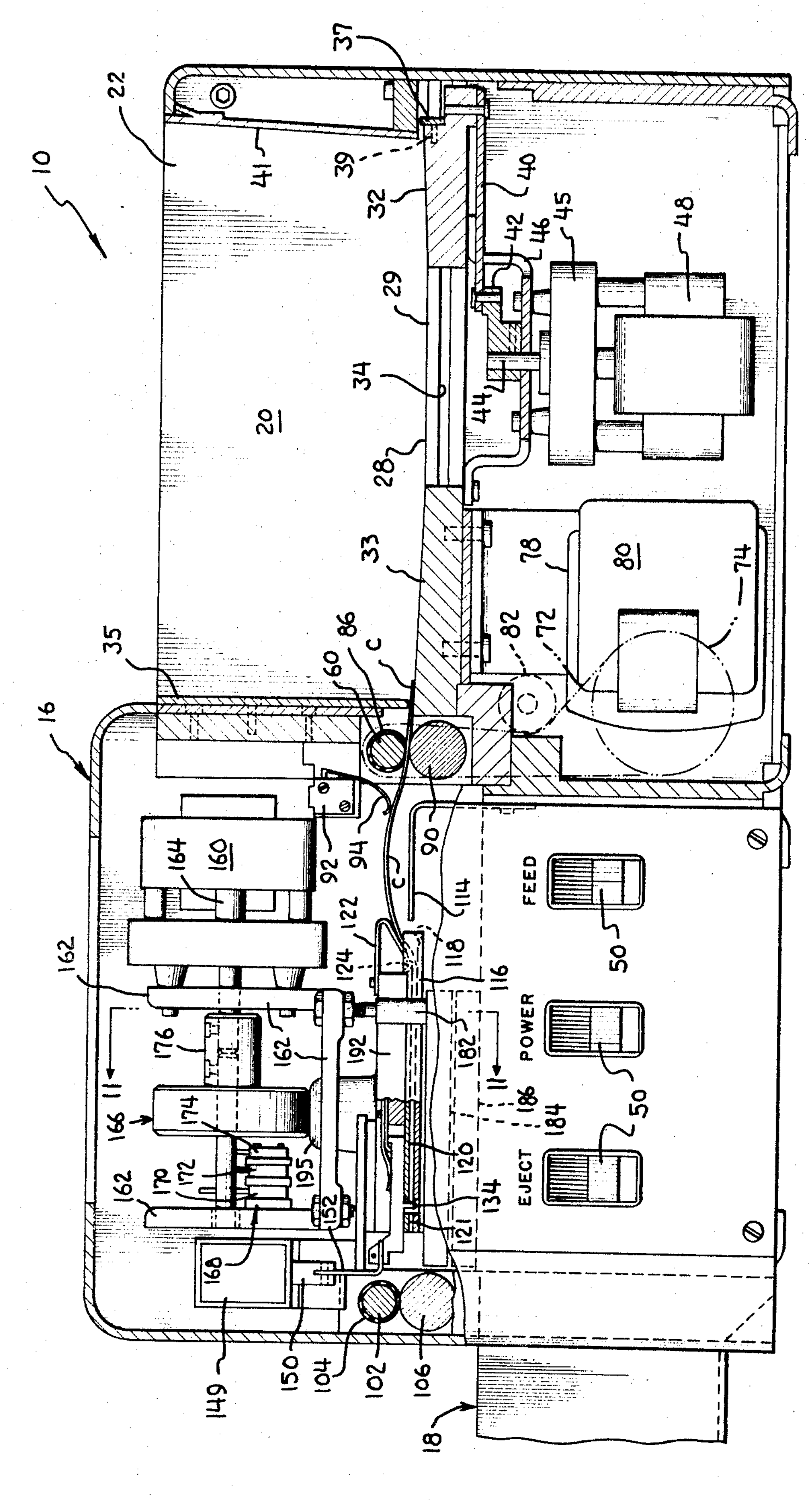
FIG. 2 is an elevation of the apparatus shown in FIG. 1, partially sectioned to show the details of the drive and reader components of the apparatus.
Figure 3:
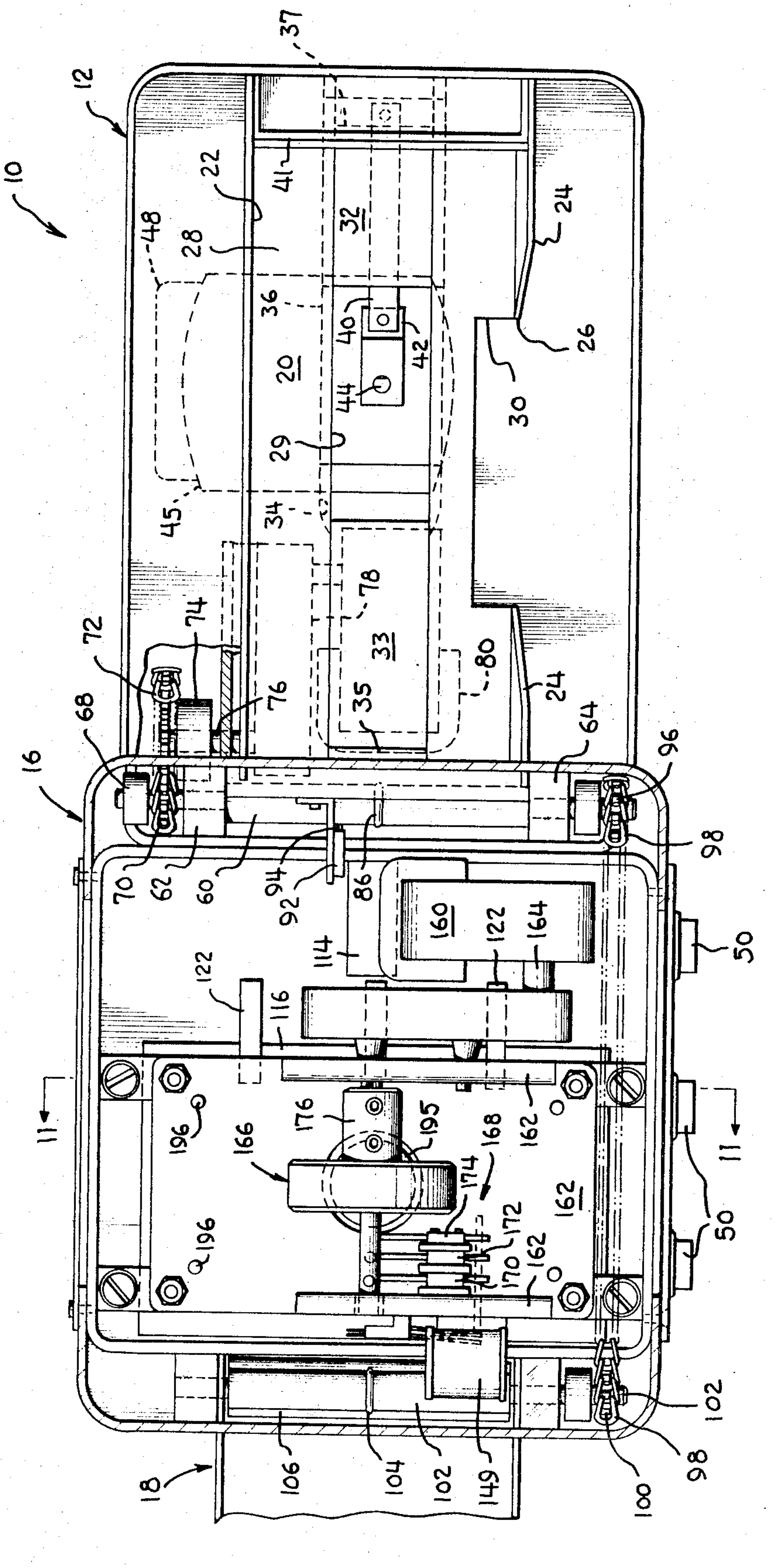
FIG. 3 is a plan view of the apparatus shown in FIG. 1.

Turning now to the card storage bin 20 and the picker mechanism of the apparatus, reference is made to FIGS. 1, 2 and 3. As can be seen, the storage bin 20 includes a back wall 22 which is continuous throughout the depth of the bin. Spaced from 22 by a distance approximating a card width is a front wall comprised of two portions 24 separated by a tapering opening 26 to permit a stack of cards to be placed in the bin as a stock rather than one at a time. The bottom of the bin is defined by a floor shown as 28, relieved at the front portion as shown in FIG. 1 by the numeral 30 to accommodate the fingers of one holding a stack of cards. As shown in FIG. 3, the center of the base 28 includes structure defining a card positioning and picking mechanism comprised of a sliding block 32 at the right-hand end, a fixed block 33 at the left-hand end and a vertically disposed block 35 attached to the side of the housing of 16. The plate 35 is of a width approximating the width of the elements 32 and 33 and the lower edge is positioned to define the card exit. Each of the blocks 32 and 33 has an upper surface tapering inwardly toward the center of the bin by a slight amount. This tends to cause the sliding block 32 to drive the cord in a slight downward sense under the stack of cards and to cause the fixed block 33 to guide the card slightly upwardly as it leaves the storage bin 20.

The floor 28 of bin 20 includes in the center thereof a slot shown as 29, which contains in the defining side walls a groove 34 to receive a projection 36 from the side of the sliding block 32. The projections 36 on the block 32 cooperate with the grooves to guide the block in its travel along the floor of bin 20. At the top right of block 32 is a blade shown as 37 fastened by means of a screw shown as 39 in a position to project slightly above the upper surface of 32. The edge of 37 is made to extend above the surface of 32 by an amount slightly less than the thickness of a card. The block 32 has a normal position, as shown in FIG. 2, with the blade 37 positioned back beneath a rear sidewall shown as 41 of the bin 20. The sidewall 41 is made to slope slightly inwardly, as shown in FIG. 2, so as to better present the edge of a single card to the blade 37, when the block 32 is driven to pick a card.

Figures 4, 5:
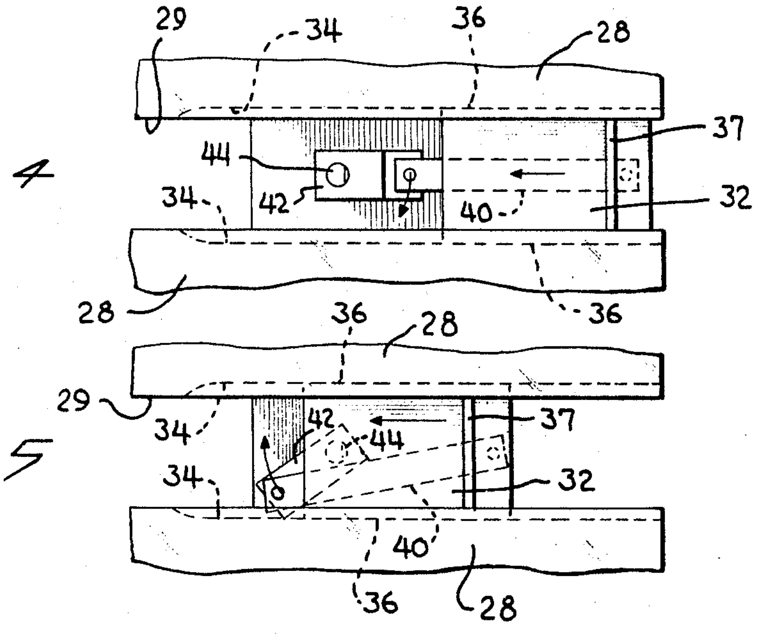
FIGS. 4 and 5 are plan views of the card picker mechanism of the apparatus shown in FIGS. 2 and 3 in different positions of operation.
Figure 6:
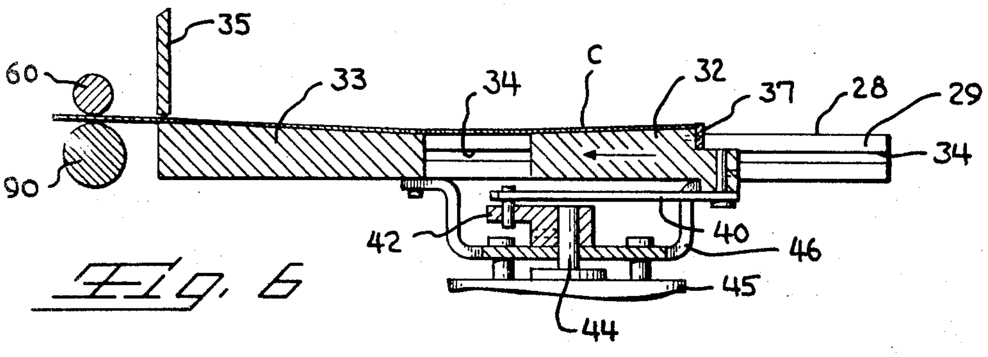
FIG. 6 is a side view in partial section of the picker mechamism shown in FIGS. 2 and 3.

The sliding block 32 is connected by a link shown as 40, pivotally tied thereto and to an arm 42, which is secured to a rotary shaft shown as 44. The shaft 44 is driven through a gear mechanism shown as 45 by a motor shown as 48. As 44 is rotated, the arm 42 is also rotated to reciprocate the arm 40 and the block 32 in the manner shown in FIGS. 4 and 5. The picker drive and linkage mechanism thus described is secured beneath the floor 28 by a bracket shown as 46. As will be apparent from FIG. 2, the stroke of 32 is approximately half the length of the card. As will be apparent from FIGS. 4 and 5, the blade 37 is of a length to present a substantial surface area in engagement with the edge of the card to prevent card damage.

Operation of the motor 40 drives the card C to the left and between a pair of rollers shown as 60 and 90 in the center of FIG. 2. The roller 60 is a driven roller and the roller 90 is a support roller. Each of the rollers is supported in the frame by bearings, such as those shown in FIG. 3 as 62 and 64 supporting the upper roller 60. On each end of the driven roller 60 is a gear shown as 68, with reference to the upper member in FIG. 3, having a series of teeth shown as 70 engaged by a drive chain shown as 72. The drive chain is made to engage a larger driving gear shown as 74, positioned generally beneath the floor of the bin 20, as shown in FIG. 2. The main drive gear 74 is mounted on a shaft shown as 76, in FIG. 3, driven in rotary movement through a gear box 78 and a motor shown as 80. A takeup gear is shown as 82 in FIG. 2. Energization of motor 80 operates to drive the roller 60 in a clockwise sense. Around the center of roller 60 is provided an O-ring shown as 86, which is made to contact the upper surface of a card C and provide a proper and frictional engagement therewith. This eliminates the need for an exact placement of the roller 60 with respect to the roller 90 or any surface treatment of the rollers to prevent card slippage. The use of the single O-ring in the center of the roller 60 has been found to provide an accurate and positive card drive without card damage.

A microswitch shown as 92 is positioned as indicated in FIGS. 2 and 3, with the actuating arm thereof shown as 94, extending downwardly adjacent roller 60 and in the path of card travel. The switch 92 is operated by the presence of a card to disable motor 48 of the picker mechanism. In the absence of a card in a position to close the contacts of 92 by an engagement with the end of 94 the motor 48 is enabled to be energized responsive to a feed command.

Referring to FIG. 3, the lower end of roller 60 includes a gear positioned thereon, shown as 96, linking a drive chain shown as 98, which is extended over to the opposite side of the reader 16. There the chain 98 is made to engage a gear 100 secured to an eject drive roller 102. The roller 102 includes an O-ring 104 in the center thereof having the purpose and function of the ring 86 previously mentioned.

Figures 7, 11, 12:
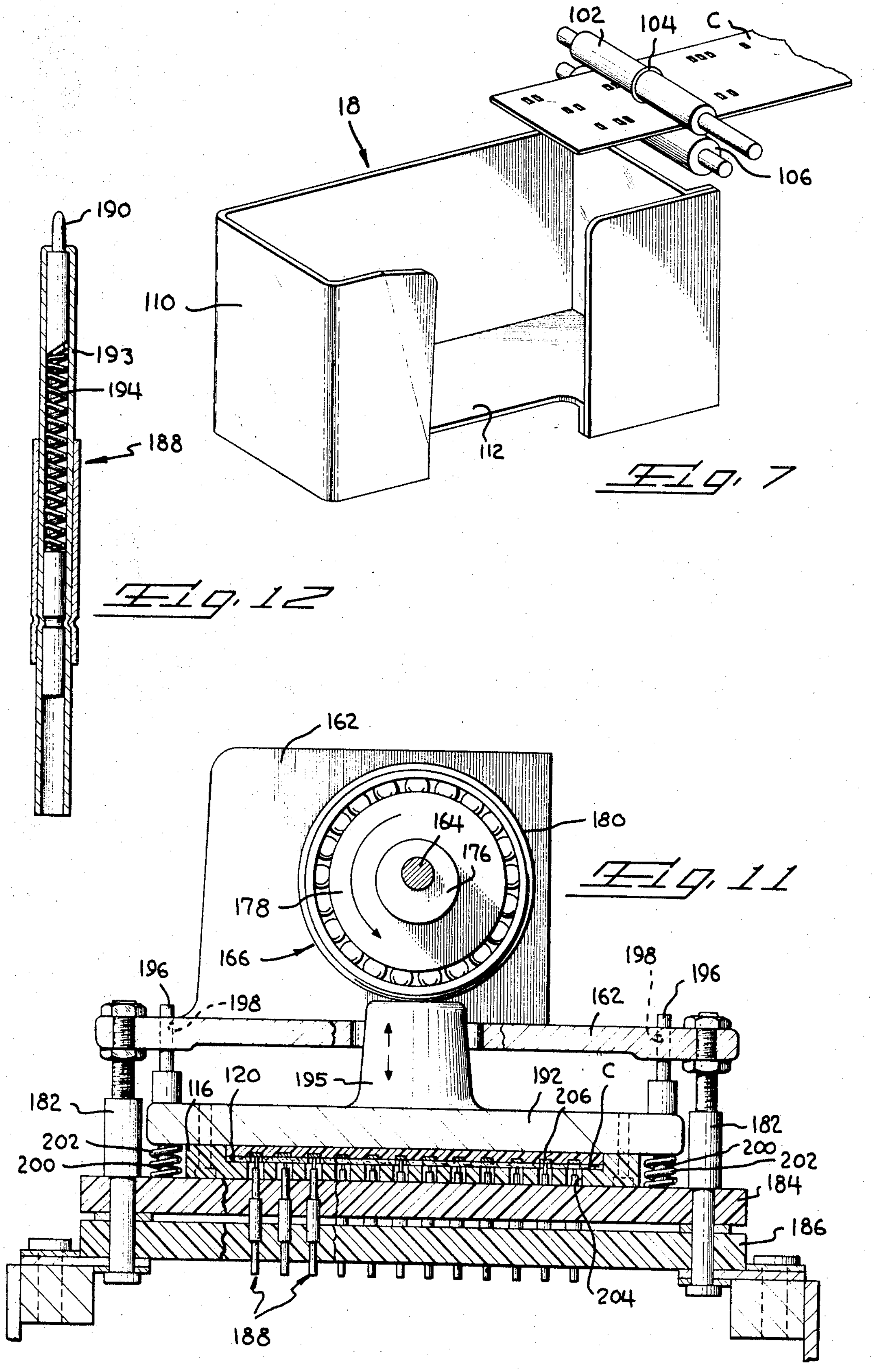
FIG. 7 is a perspective showing part of the eject mechanism and the read card storage bin of the apparatus shown in FIG. 1.
FIG. 11 is a side view in partial section of the reader of the invention shown in FIGS. 2 and 3, along the lines 11–11.
FIG. 12 is an elevational in section of a contact pin as utilized in the reader shown in FIG. 11.

The roller 102 is shown in driving relation to a support roller 106 in FIG. 7. Both rollers are supported by bearings in the housing of the apparatus. Energization of the drive motor 80 to cause a rotation of a roller 60 in a clockwise sense simultaneously causes a rotation of roller 102 in a clockwise sense. The floor of the storage bin 20, the rollers 60 and 90, the read head to be described and the rollers 102 and 106 lie generally in a common plane. FIG. 2 shows the reader in an engagement position, or down relative to the path of the card during movement into or out of the reader.

The rollers 60, 90 and 102, 106 are spaced apart, in the embodiment shown, by a distance less than the length of card C. Movement of the card from the initial storage position in bin 20 through the apparatus is in one direction. Drive of roller 102 when a card is in engagement therewith, results in the card being driven outwardly to a point of engagement with an end wall 110 of bin 18 and out of the reader portion of the apparatus. Ejected cards are automatically stacked on the floor shown as 112 in FIG. 7 of bin 18.

Turning now to the reader portion of the apparatus and referring to FIG. 2, as the card C leaves the drive rollers 60 and 90 it is supported by a bracket shown as 114 anchored to the frame of the apparatus housing. Aligned with the travel of card C is a plastic card housing 116 having a lower tapered lip 118 at the mouth thereof leading to a card recess shown as 120 which extends through 116 to a card exit 121 in alignment with the eject rollers 100 and 106. The card housing 116 is secured to the reader assembly for vertical movement relative to the housing of the apparatus. The housing 116 is secured to a metallic plate shown as 192, containing at the forward end a spring member 122 attached thereto to project out over the entry to 116. The spring member 122 includes an inwardly directed portion 124 curved at its end and positioned to guide the leading edge of a card C down within 116. The card C, as it progresses under drive from the drive roller 60 and 90, is thus guided within 116 between the spring 122 and the tapered entry 118. Once the card is within 116 it is driven therealong until it strikes a projecting stop shown as 134 in FIG. 2.

Figure 8:
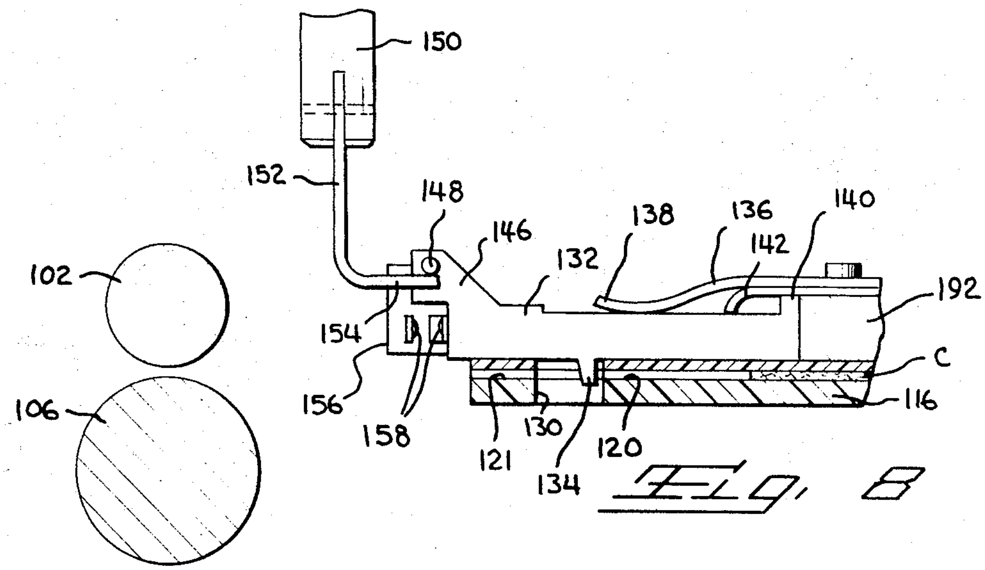
FIGS. 8, 9 and 10 are side views in partial section of the card positioning mechanism and of the eject mechanism shown in FIGS. 2 and 3.
Figure 9:
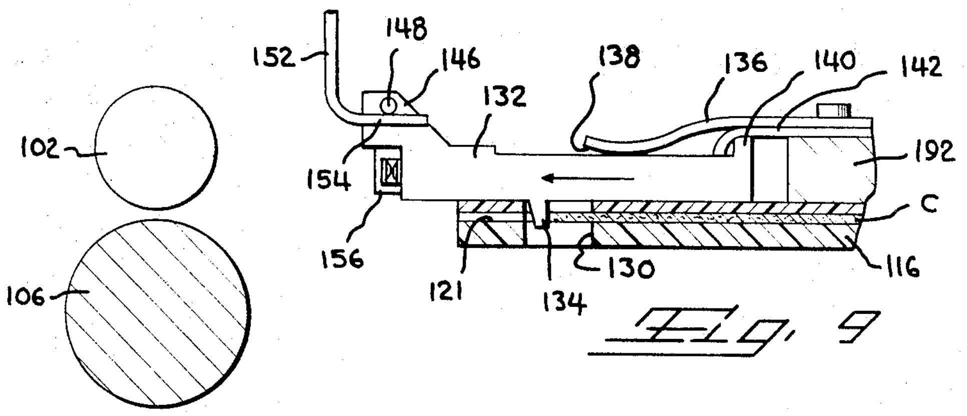
Figure 10:
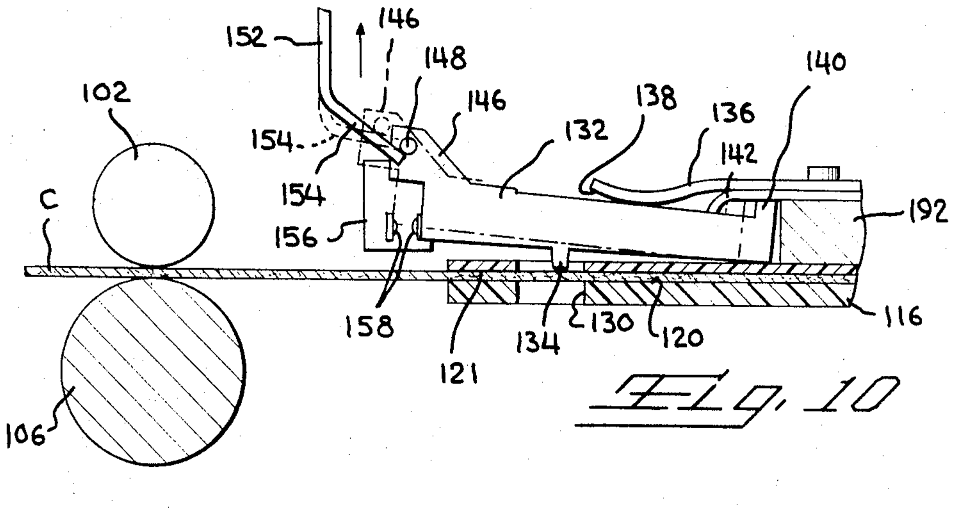

FIGS. 8, 9 and 10 show the stop structure in greater detail. As can be seen from FIG. 8, the stop 134 is a projecting part of a slide member 132 carried on top of 116 in a position so that the stop 134 projects down through an aperture 130 therein through the card passage. The slide 132 is biased down against the top of 116 by a first spring shown as 136 secured to the plate 192. The end of the spring 136 is curved as at 138 to permit return of the slide 132 to the position shown in FIG. 8 after operation. The spring loaded movement of 132 serves to cushion card engagement to avoid card damage.

At the right-hand end of 132 is an upward projection shown as 140, which is made to engage a curved down end of a further spring 142 anchored to 192 beneath the spring 136. The spring 142 serves to limit the leftward travel of the slide 132 and at the same time permit 132 to be cocked in the manner shown in FIG. 10. The lefthand end of slide 132 includes an upward projection shown as 146 carrying a pin 148 transverse to the body of the slide. A solenoid 149, positioned as shown in FIG. 2, is attached to the housing of the apparatus with the arm thereof shown as 150 oriented downwardly, as shown in FIGS. 8—10, to position a spring extension 152 having a projecting portion 154 displaced beneath the pin 148. Operation of solenoid 149 draws 150 upwardly to in turn draw 148 and the slide upwardly in the manner shown in FIG. 10.

As card C is driven inwardly of 116, it engages the stop 134 and drives the slide 132 to the left, as shown in FIG. 9. Axially aligned with 132 and in its path of travel is a switch 156 having contact points 158 positioned to be engaged and closed by 132 in its leftward movement under drive of C. Closure is shown in FIG. 9. The extension 152 has spring characteristics so that when the solenoid arm 150 is drawn upwardly it will deflect slightly to restore 132 to the inward position in the manner shown in FIG. 10. This will open the contacts 158 and deenergize the switch 156 and simultaneously free the card C from being held by 134 against leftward travel.

In the normal sequence of events, after the drive motor 80 has been energized the rollers 60 and 90 will drive the card inwardly of 116 to drive 132 to the left and close the switch 156. As shown in FIG. 2, there is a space between the point of card contact with the rollers 60 and 90 and the point of confinement of the card within 116. Any slight excess in card travel due to drive will be accommodated by this space which permits the card to bow slightly. The portion of the card which is to be read is, nevertheless, accurately positioned and confined within the reader.

When the switch 156 is operated by reason of a card C being properly positioned within the reader head, it will close a circuit to open a further switch, not shown, to deenergize the drive motor 80 and at the same time energize the reader drive motor shown as 160 to effect a read cycle.

The reader and its drive mechanism is secured within the housing above the path of travel, as shown in FIG. 2. The reader includes a bracket shown as 162 having the motor 160 secured to one side thereof with the motor drive shaft shown as 164 supported in bearings in the bracket walls and extending between the bracket walls. The shaft 164 carries in the center thereof a cam mechanism 166 rotated by the motor drive. Attached to the left wall of bracket 162 is a switch bank shown as 168 including three microswitches 170, 172 and 174. These microswitches have actuating arms made to engage projections or depressions thereon to be selectively opened or closed responsive to shaft rotation.

FIG. 11 shows in section the reader head. As can be seen in FIG. 11, the shaft 164 is connected to an eccentric 176 which turns in a cylindrical race 178 having a ball bearing supported outer race 180 defining the cam surface. Suspended beneath bracket 162 are insulating boards 184 and 186 which are clamped together to hold a series of contact pins shown as 188 in a fixed array beneath 116. Posts 182 are provided attached to the housing, as indicated in FIG. 11, to secure the bracket 162 and boards 184 and 186. Each of the contact pins has a construction, as generally shown in FIG. 12, to include a forward contact pin member shown as 190, slidably supported in an outer sleeve 192 and biased upwardly by a compression spring 194. The contact pins are positioned to extend above the upper surface of 184, as shown in FIG. 11. The block 116 is carried for vertical movement by a plate shown as 192 having an upwardly projecting portion 194 engaged by the cam surface 180. The plate 192 has at each edge an aligning pin, shown as 196, fitted within the bottom of bracket 162 in an aperture therein, shown as 198, and made to extend below the lower surface of 192, as shown as 200. Springs 202 serve to drive 192 upwardly upon rotation of 180 past center. The member 116 is attached to the plate 192 so as to be driven downwardly and upwardly during a 360° rotation of the cam.

FIG. 11 shows 116 in its downward position. As can be seen from FIG. 11, the block 116 includes a series of grooves shown as 204, which are in alignment with rows of contact pins 188. Above each groove is a printed circuit pad, shown as 206, embedded in the material of the portion of 116 and also in alignment with rows of the contact pins 188. When the reader is closed to a reading position, as shown in FIG. 11, with a card inserted therein the contact members 190 are caused to contact a given pad 206 wherever there is an aperture in the card and are prevented from making contact with a pad 206 where there is no aperture in the card. In this manner selective patterns of contact pins 188 may be connected together or energized to develop signals representative of the data stored in the card. Leads connected to the lower ends of the pins of contact pins 188, but not shown, are employed to provide an output from the reader. Reference is made to U.S. application Ser. No. 551,765 filed May 20, 1966, in the name of John E. McWade and entitled PUNCHED DATA CARD READER for a more detailed showing of a preferred embodiment of contact member and conductor pad arrangement.

Having now described the various components of the apparatus, a summary of the operation thereof will be given. Assume that there is a stack of cards in the storage bin 20. Depression of the pushbutton 50 labeled POWER energizes the various circuits of the apparatus. Operation is initiated by a depression of the pushbutton 50 labeled FEED to cause operation of the picker mechanism by energizing motor 48. At this time it is assumed that there is no card in the position which would cause the switch 92 to be closed, disabling 48. Depression of the FEED pushbutton will also energize the motor 80 to start the drive roller 60. The card will then be picked from the bottom of the stack by the block 32 through an engagement with the blade 37 and driven into the drive rollers 60 and 90, which are then being driven. The motor 48 includes an interlock which operates to cause the motor to drive through a cycle restoring 32 to the position shown in FIG. 2 with the motor then being cut off. The switch 92 is disabled to permit motor 48 to return block 32 at this time. The card leading edge will then be driven by the drive rollers 60 and 90 into an engagement with 94 operating switch 92 to disable the motor 48 from further operation, after block 32 has been restored. The card leading edge will then travel to the left to be guided within 116 and along 120 to engage stop 134 and displace 132 to the left, closing the switch 156. This will cause motor 80 to be deenergized and motor 160 be energized. The motor 160 will then cause the cam 180 to be rotated, driving the reader into a closed position by driving 116 downwardly. The microswitch shown as 172 has a feeler arm which operates the switch to indicate that a reader is in an open position. A separate control device such as a stepping switch operates upon a rotation of 180° of the shaft 164 to cut off motor 160 and leave the reader in a closed position. The microswitch 172 includes an arm positioned to be operated when the reader is in the closed position to develop a gate signal to external equipment adapted to energize the contact pins 188. The switch 174 may be used to develop auxiliary control signals.

The card may then be read with outputs being produced simultaneously from all bit positions thereon, or, through means external to the apparatus, the card may be scanned, row by row or column by column.

If it is then desired to open the reader the EJECT pushbutton may be depressed. This will cause the reader motor 160 to open the reader by rotating 180 through 180° and then cut off. It sill also cause the motor 80 to be energized, again driving the rollers 60, 90 and 100, 106. At the same time, solenoid 149 is energized to pull 132 and 134 upwardly, clear of the leading edge of the card. The trailing edge of the card is at this time still within the rollers 60 and 90 and the card is thus driven to the left to a point of engagement with the rollers 100 and 106 which operate to catch the card and drive it outwardly into the storage bin 18. At this time, the motor 80 is deenergized to stop the roller drive by a separate switch, not shown, which may be connected to a separate control logic circuit or to a switch driven by a connection with 80 and energized after a measured travel of the driver rollers.

It is contemplated that the apparatus may be driven to automatically pick, read and eject the cards continuously by a control circuit including a standard stepping motor operated to sequentially close circuit paths to the feed and eject circuits. It is also contemplated that the apparatus may be driven to feed cards without reading by disabling the circuits supplying motor 160.

It is contemplated that cards of different configurations, such as the more standard 960 bit position card, may be handled by the apparatus. It may be necessary to add an additional set of rollers between the drive rollers 60, 90 and 100, 106 to accommodate such cards or it may be necessary to change the overall spacing between the rollers for this purpose. Since the rollers are driven by a common drive, this addition may be easily implemented.

The apparatus of the invention may be made in a size which is readily portable so as to be attached to vehicles which are directly programmed by the data on cards read by the machine. To this end the invention provides a small sized and readily portable memory which may be automatically operated by a simple control circuit to guide, direct or sequence production, transportation or other equipment.

We claim:

1. In an apparatus for providing storage and readout from punched cards, a housing including a card storage bin of a configuration to hold a stack of data cards, a picker mechanism in the floor of said bin operable to pick one card from the bottom of said stack and present said picked card to a drive feed means including a drive roller, reader means positioned in said housing adjacent said bin and drive feed means having an open condition with a card-receiving block having a slot aligned with said drive roller and resilient guide means attached thereto to guide a card driven by said roller into said slot, a resilient stop means in said reader means extending through said slot at one end and operable to stop a card driven therein in a read position, a plurality of resilient contact pins carried in a fixed position in said reader means, one for each bit position on a data card and each adapted to be connected to signal leads to provide read signals, said reader means including a drive connected to said block to force a card therein down against said contact pins in a closed condition, said block including means to energize contact pins passing through said card to develop said read signals, means to restore said block to an open condition in alignment with an eject means including an eject roller and means to operate said roller to eject a card after reading into a storage bin shaped to stack ejected cards, wherein said eject and drive feed roller are spaced apart along the path of card travel by a distance less than a card length and said stop means is positioned to stop said card with a portion thereof remaining in said drive feed means during reading, wherein said stop means is spring loaded and includes means responsive to a slight travel of said stop means to cushion the stopping of said card under drive of said drive means and means responsive to predetermined movement of said stop means for operating said reader.

2. The apparatus of claim 1 wherein said eject and drive feed rollers are driven by a common motor drive.

3. The apparatus of claim 1 wherein said reader means is driven by a separate motor to permit card feed without operation of said reader means.

4. The apparatus of claim 1 wherein there is a space between said drive and said read means operable to permit a slight bowing of said card to accommodate drive cycle tolerances.

5. The apparatus of claim 1 further including means to drive said reader means to close and open in a sense transverse to card travel.